United States Patent
Sun et al.

(10) Patent No.: US 11,501,182 B2
(45) Date of Patent: Nov. 15, 2022

(54) METHOD AND APPARATUS FOR GENERATING MODEL

(71) Applicant: Baidu Online Network Technology (Beijing) Co., Ltd., Beijing (CN)

(72) Inventors: Mingming Sun, Beijing (CN); Xu Li, Beijing (CN); Ping Li, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 804 days.

(21) Appl. No.: 16/502,701

(22) Filed: Jul. 3, 2019

(65) Prior Publication Data
US 2020/0012953 A1    Jan. 9, 2020

(30) Foreign Application Priority Data
Jul. 3, 2018    (CN) .......................... 201810719830.8

(51) Int. Cl.
*G06F 40/151*    (2020.01)
*G06F 40/126*    (2020.01)
(Continued)

(52) U.S. Cl.
CPC .............. *G06N 5/025* (2013.01); *G06F 17/18* (2013.01); *G06F 40/126* (2020.01);
(Continued)

(58) Field of Classification Search
None
See application file for complete search history.

(56) References Cited

U.S. PATENT DOCUMENTS 10,467,274 B1 *  11/2019  Ren .................... G06N 3/0445
10,474,709 B2 *  11/2019  Paulus ................ G06N 3/0454
(Continued)

FOREIGN PATENT DOCUMENTS

CN   105894088    8/2016
CN   107491534    12/2017
(Continued)

OTHER PUBLICATIONS

Solan et al. "Unsupervised learning of natural languages", 2005, Proceedings of the National Academy of Sciences, 102(33), pp. 11629-11634. doi: 10.1073/pnas.0409746102. (Year: 2005).*

(Continued)

*Primary Examiner* — Ariel Mercado
*Assistant Examiner* — Ariel Mercado Vargas
(74) *Attorney, Agent, or Firm* — Knobbe, Martens, Olson & Bear, LLP

(57) ABSTRACT

A method and an apparatus for generating a model are provided. The method includes: acquiring a sample set including sample sentences and labeling knowledge corresponding thereto; and selecting a sample from the sample set, and performing following training steps: inputting a sample sentence into a first initial model to generate first prediction knowledge corresponding to the sample sentence; inputting the first prediction knowledge into a second initial model to generate a first prediction sentence corresponding to the first prediction knowledge; inputting labeling knowledge into the second initial model to generate a second prediction sentence corresponding to the labeling knowledge; inputting the second prediction sentence into the first initial model to generate a second prediction knowledge corresponding to the second prediction sentence; determining a first reward signal; and training, using a reinforcement (Continued)

learning method based on the first reward signal to obtain a first model.

15 Claims, 5 Drawing Sheets

(51) Int. Cl.
*G06N 5/02* (2006.01)
*G06N 20/20* (2019.01)
*G06K 9/62* (2022.01)
*G06F 17/18* (2006.01)

(52) U.S. Cl.
CPC ......... *G06F 40/151* (2020.01); *G06K 9/6215* (2013.01); *G06K 9/6256* (2013.01); *G06N 20/20* (2019.01)

(56) References Cited

U.S. PATENT DOCUMENTS

2018/0150905 A1* 5/2018 Lee .................. G06F 40/30
2018/0165554 A1* 6/2018 Zhang ................ G06N 3/0454
2018/0329883 A1* 11/2018 Leidner ............... G06F 40/247
2020/0097507 A1* 3/2020 Ahn ..................... G06N 3/08

FOREIGN PATENT DOCUMENTS

| CN | 107608970 | 1/2018 |
| CN | 107622050 | 1/2018 |
| CN | 107783960 | 3/2018 |
| CN | 107861954 | 3/2018 |
| CN | 107943847 | 4/2018 |

OTHER PUBLICATIONS

Lin et al. "Collaborative Deep Reinforcement Learning", 1997, In Proceedings of ACM Woodstock conference, El Paso, Texas USA, Jul. 1997 (WOODSTOCK'97), 9 pages (Year: 1997).*

* cited by examiner

METHOD AND APPARATUS FOR GENERATING MODEL

CROSS-REFERENCE TO RELATED APPLICATIONS

This application claims priority to Chinese Patent Application No. 201810719830.8, filed on Jul. 3, 2018, titled "Method and Apparatus for Generating Model," which is hereby incorporated by reference in its entirety.

TECHNICAL FIELD

Embodiments of the present disclosure relate to the field of computer technology, specifically to a method and apparatus for generating a model.

BACKGROUND

Natural language processing is a technology that processes the language that people use every day to achieve effective communication with computers. It is an important research direction in the field of artificial intelligence. In natural language processing, it is often necessary to use a knowledge base to understand a text language. The knowledge base may provide rich entity knowledge information, including attribute information of entities and relationship information between entities, etc. Therefore, how to extract valid knowledge information from a natural language to construct the knowledge base has become a hot issue for the research and exploration in academia and industry.

Due to the flexibility of the natural language, automated information extraction is quite difficult. Especially for extraction of open information of entities without defining the fields and categories of the open information, it is necessary to extract knowledge of entities, entity relationships, etc. of open categories from massive, redundant, and noise containing non-standard texts. At present, schemes adopted by academia and industry are mostly rule-based methods. One of the rule-based methods is to parse sentences to generate a parse tree, and to apply rules on the parse tree to extract corresponding information. For example, the corresponding information is extracted according to the position rules of the subject, the predicate and the object in the sentence grammar. These rules are usually set by experts. For the extraction of different types of information, the forms of the rules are usually different. Therefore, in an open information extraction scenario in which various types of information are extracted, a large number of rules need to be set.

SUMMARY

Embodiments of the present disclosure propose a method and apparatus for generating a model.

In a first aspect, the embodiments of the present disclosure provide a method for generating a model, including: acquiring a sample set, the sample set including sample sentences and labeling knowledge corresponding to the sample sentences; and selecting a sample from the sample set, and performing the following training steps: inputting a sample sentence in the selected sample into a first initial model to generate first prediction knowledge corresponding to the sample sentence; inputting the first prediction knowledge into a second initial model to generate a first prediction sentence corresponding to the first prediction knowledge; inputting labeling knowledge into the second initial model to generate a second prediction sentence corresponding to the labeling knowledge; inputting the second prediction sentence into the first initial model to generate a second prediction knowledge corresponding to the second prediction sentence; determining a first reward signal according to at least one of the following information items: a degree of the first prediction knowledge conforming to a preset knowledge expression rule, a similarity between the first prediction knowledge and the labeling knowledge, and a probability that the second prediction knowledge is the labeling knowledge; and training, using a reinforcement learning method based on the determined first reward signal, to obtain a first model.

In some embodiments, the training steps further include: determining a second reward signal according to at least one of the following information items: a degree of the second prediction sentence conforming to a preset language expression rule, a similarity between the second prediction sentence and the sample sentence, and a probability that the first prediction sentence is the sample sentence; and training, using the reinforcement learning method based on the determined second reward signal, to obtain a second model.

In some embodiments, the first initial model includes an encoder and a decoder; and the inputting a sample sentence into a first initial model to generate first prediction knowledge corresponding to the sample sentence, includes: constructing an input sequence based on the sample sentence; mapping the input sequence to an input hidden state sequence using the encoder, and mapping an output sequence to an output hidden state sequence using the decoder; decoding the input hidden state sequence using the decoder to generate a prediction state sequence; and obtaining the first prediction knowledge based on the prediction state sequence.

In some embodiments, the decoding the input hidden state sequence using the decoder to generate a prediction state sequence, includes: acquiring, for a target position in a to-be-generated prediction state sequence, a state of a hidden layer of the decoder after the decoder acquires a prediction state of a last position prior to the target position by decoding, as a current hidden state of the decoder; calculating matching degrees between input hidden states in the input hidden state sequence and a prediction state of the target position in the to-be-generated prediction state sequence based on the current hidden state; calculating attention weights of the input hidden states on the prediction state of the target position based on the matching degrees; performing a weighted sum of the input hidden states according to the attention weights to obtain a context vector; calculating a probability distribution of the prediction state of the target position based on the context vector, an output hidden state of the last position prior to the target position in the output hidden state sequence, and a state of the hidden layer of the decoder when the hidden layer of the decoder decodes the prediction state of the target position; and determining the prediction state of the target position based on the probability distribution.

In some embodiments, a probability of the prediction state of the target position is: a sum of a probability of copying a target word from a corresponding sample sentence as a target object in the output sequence and a probability of selecting a target symbol from a preset symbol set and using an object represented by the target symbol as an object in the output sequence; and symbols in the preset symbol set are used in conjunction with words in the sample sentence to fully represent one of the following knowledge in the sample sentence: knowledge based on a verb or a preposition, knowledge based on a noun attribute, entity description knowledge and knowledge of a relationship between an entity and a concept.

In some embodiments, the method further includes: updating, in response to copying a target word from a corresponding sample sentence as an object in the output sequence, a probability of copying the target word from the corresponding sample sentence as an object in the output sequence to zero.

In a second aspect, the embodiments of the present disclosure provide an apparatus for generating a model, including: an acquisition unit, configured to acquire a sample set, the sample set including sample sentences and labeling knowledge corresponding to the sample sentences; and a training unit, configured to select a sample from the sample set, and perform the following training steps: inputting a sample sentence in the selected sample into a first initial model to generate first prediction knowledge corresponding to the sample sentence; inputting the first prediction knowledge into a second initial model to generate a first prediction sentence corresponding to the first prediction knowledge; inputting labeling knowledge into the second initial model to generate a second prediction sentence corresponding to the labeling knowledge; inputting the second prediction sentence into the first initial model to generate a second prediction knowledge corresponding to the second prediction sentence; determining a first reward signal according to at least one of the following information items: a degree of the first prediction knowledge conforming to a preset knowledge expression rule, a similarity between the first prediction knowledge and the labeling knowledge, and a probability that the second prediction knowledge is the labeling knowledge; and training, using a reinforcement learning method based on the determined first reward signal, to obtain a first model.

In some embodiments, the training unit further includes: a determining subunit, configured to determine a second reward signal according to at least one of the following information items: a degree of the second prediction sentence conforming to a preset language expression rule, a similarity between the second prediction sentence and the sample sentence, and a probability that the first prediction sentence is the sample sentence; and a training subunit, configured to train, using the reinforcement learning method based on the determined second reward signal, to obtain a second model.

In some embodiments, the first initial model includes an encoder and a decoder; and the training unit is further configured to generate first prediction knowledge corresponding to the sample sentence as follows: constructing an input sequence based on the sample sentence; mapping the input sequence to an input hidden state sequence using the encoder, and mapping an output sequence to an output hidden state sequence using the decoder; decoding the input hidden state sequence using the decoder to generate a prediction state sequence; and obtaining the first prediction knowledge based on the prediction state sequence.

In some embodiments, the training unit is further configured to generate a prediction state sequence as follows: acquiring, for a target position in a to-be-generated prediction state sequence, a state of a hidden layer of the decoder after the hidden layer of the decoder decodes a prediction state of a last position prior to the target position as a current hidden state of the decoder; calculating matching degrees between input hidden states in the input hidden state sequence and a prediction state of the target position in the to-be-generated prediction state sequence based on the current hidden state; calculating attention weights of the input hidden states on the prediction state of the target position based on the matching degrees; performing a weighted sum of the input hidden states according to the attention weights to obtain a context vector; calculating a probability distribution of the prediction state of the target position based on the context vector, an output hidden state of the last position prior to the target position in the output hidden state sequence, and a state of the hidden layer of the decoder after the hidden layer of the decoder decodes the prediction state of the target position; and determining the prediction state of the target position based on the probability distribution.

In some embodiments, a probability of the prediction state of the target position is: a sum of a probability of copying a target word from a corresponding sample sentence as a target object in the output sequence and a probability of selecting a target symbol from a preset symbol set and using an object represented by the target symbol as an object in the output sequence; and symbols in the preset symbol set are used in conjunction with words in the sample sentence to fully represent one of the following knowledge in the sample sentence: knowledge based on a verb or a preposition, knowledge based on a noun attribute, entity description knowledge and knowledge of a relationship between an entity and a concept.

In some embodiments, the apparatus further includes: an updating unit, configured to update, in response to copying a target word from a corresponding sample sentence as an object in the output sequence, a probability of copying the target word from the corresponding sample sentence as an object in the output sequence to zero.

In a third aspect, the embodiments of the present disclosure provide a method for extracting information, including: acquiring a to-be-processed sentence; and inputting the to-be-processed sentence into a first model generated by the method in the first aspect, and extracting knowledge contained in the to-be-processed sentence.

In a fourth aspect, the embodiments of the present disclosure provide an apparatus for extracting information, including: an acquisition unit, configured to acquire a to-be-processed sentence; and an extraction unit, configured to input the to-be-processed sentence into a first model generated by the method in the first aspect, and extract knowledge contained in the to-be-processed sentence.

In a fifth aspect, the embodiments of the present disclosure provide an electronic device, including: one or more processors; a storage apparatus, storing one or more programs thereon; and the one or more programs, when executed by the one or more processors, cause the one or more processors to implement the method in the first aspect or in the third aspect.

In a sixth aspect, the embodiments of the present disclosure provide a computer readable medium, storing a computer program thereon, the program, when executed by a processor, implements the method in the first aspect or in the third aspect.

The method and apparatus for generating a model provided by the embodiments of the present disclosure, acquire a sample set, the sample set including sample sentences and labeling knowledge corresponding to the sample sentences; and select a sample from the sample set, and perform the following training steps: inputting a sample sentence in the selected sample into a first initial model to generate first prediction knowledge corresponding to the sample sentence; inputting the first prediction knowledge into a second initial model to generate a first prediction sentence corresponding to the first prediction knowledge; inputting labeling knowledge into the second initial model to generate a second prediction sentence corresponding to the labeling knowledge; inputting the second prediction sentence into the first initial model to generate a second prediction knowledge corresponding to the second prediction sentence; determining a first reward signal according to at least one of the following information items: a degree of the first prediction knowledge conforming to a preset knowledge expression rule, a similarity between the first prediction knowledge and the labeling knowledge, and a probability that the second prediction knowledge is the labeling knowledge; and training, using a reinforcement learning method based on the determined first reward signal to obtain a first model, thereby enriching the method for generating a model.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
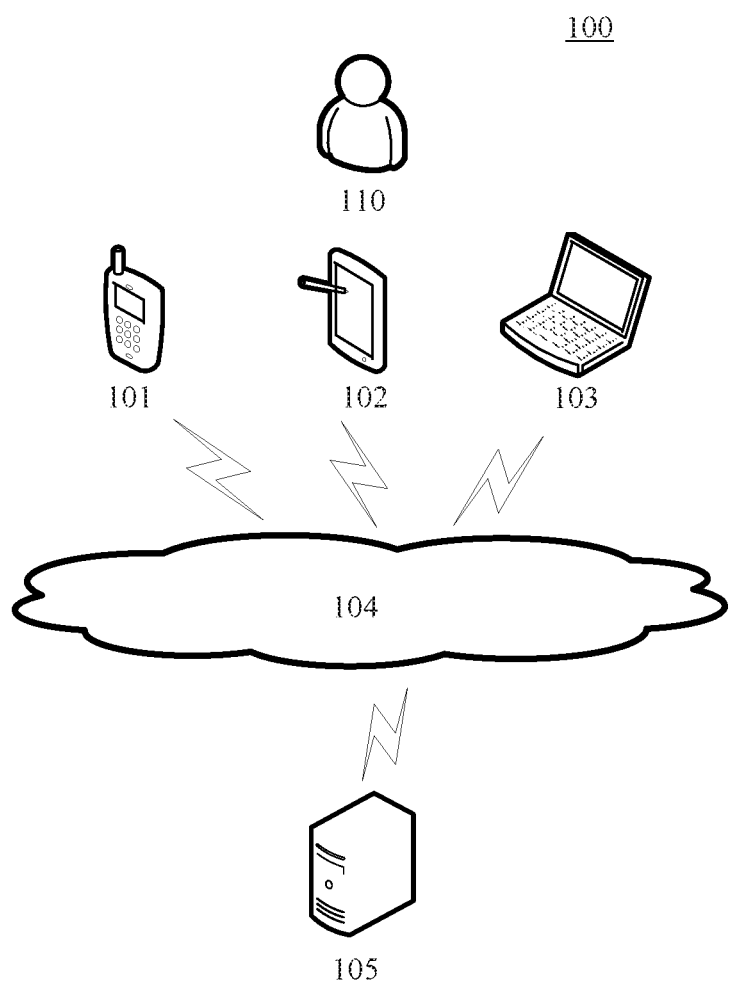
FIG. 1 is an exemplary system architecture diagram to which an embodiment of the present disclosure may be applied.

FIG. 1 illustrates an exemplary system architecture 100 to which an embodiment of a method for generating a model or an apparatus for generating a model of the present disclosure may be applied.

As shown in FIG. 1, the system architecture 100 may include terminal devices 101, 102, 103, a network 104, and a server 105. The network 104 is configured to provide a communication link medium between the terminal devices 101, 102, 103 and the server 105. The network 104 may include various types of connections, such as wired, wireless communication links, or optical fibers, and the like.

A user 110 may interact with the server 105 via the network 104 using the terminal devices 101, 102, 103, to receive or transmit messages and the like. Various applications, such as a communication client application, a voice interaction application, a document processing application, and the like, including a web browser, a shopping application, a search application, an instant messaging tool, or a social platform software, may be installed on the terminal devices 101, 102, and 103.

The terminal devices 101, 102 and 103 may be hardware or software. When being hardware, the terminal devices 101, 102 and 103 may be various electronic devices having display screens, including but not limited to smart phones, tablets, laptop portable computers, desktop computers, etc. When being software, the terminal devices 101, 102 and 103 may be installed in the above-listed electronic devices. The terminal devices 101, 102 and 103 may be implemented as a plurality of software or software modules (for example, to provide image acquisition services or live testing services), or as a single software or software module, which is not specifically limited here. The terminal device may acquire a to-be-processed sentence, input the to-be-processed sentence into a first model generated by the method for generating a model, and extract knowledge contained in the to-be-processed sentence.

The server 105 may be a server that provides various services, such as a search engine server that provides support for search results displayed on the terminal devices 101, 102, 103. The search engine server may perform semantic analysis on a received search sentence, analyze demand information contained in the search sentence, query related data based on the demand information, and feed back a query result (such as a webpage link or page content) to the terminal devices.

It should be noted that the method for extracting information provided by the embodiments of the present disclosure may be executed by the terminal devices 101, 102, 103 or the server 105. Accordingly, the apparatus for extracting information may be provided in the terminal devices 101, 102, 103 or the server 105.

It should be appreciated that the numbers of the terminal devices, the networks and the servers in FIG. 1 are merely illustrative. Any number of terminal devices, networks and servers may be provided based on the implementation requirements.

It should be noted that the server may be hardware or software. When being hardware, the server may be implemented as a distributed server cluster composed of multiple servers, or as a single server. When being software, the server may be implemented as a plurality of software or software modules (for example, to provide distributed services), or as a single software or software module, which is not specifically limited here.

Figure 2:
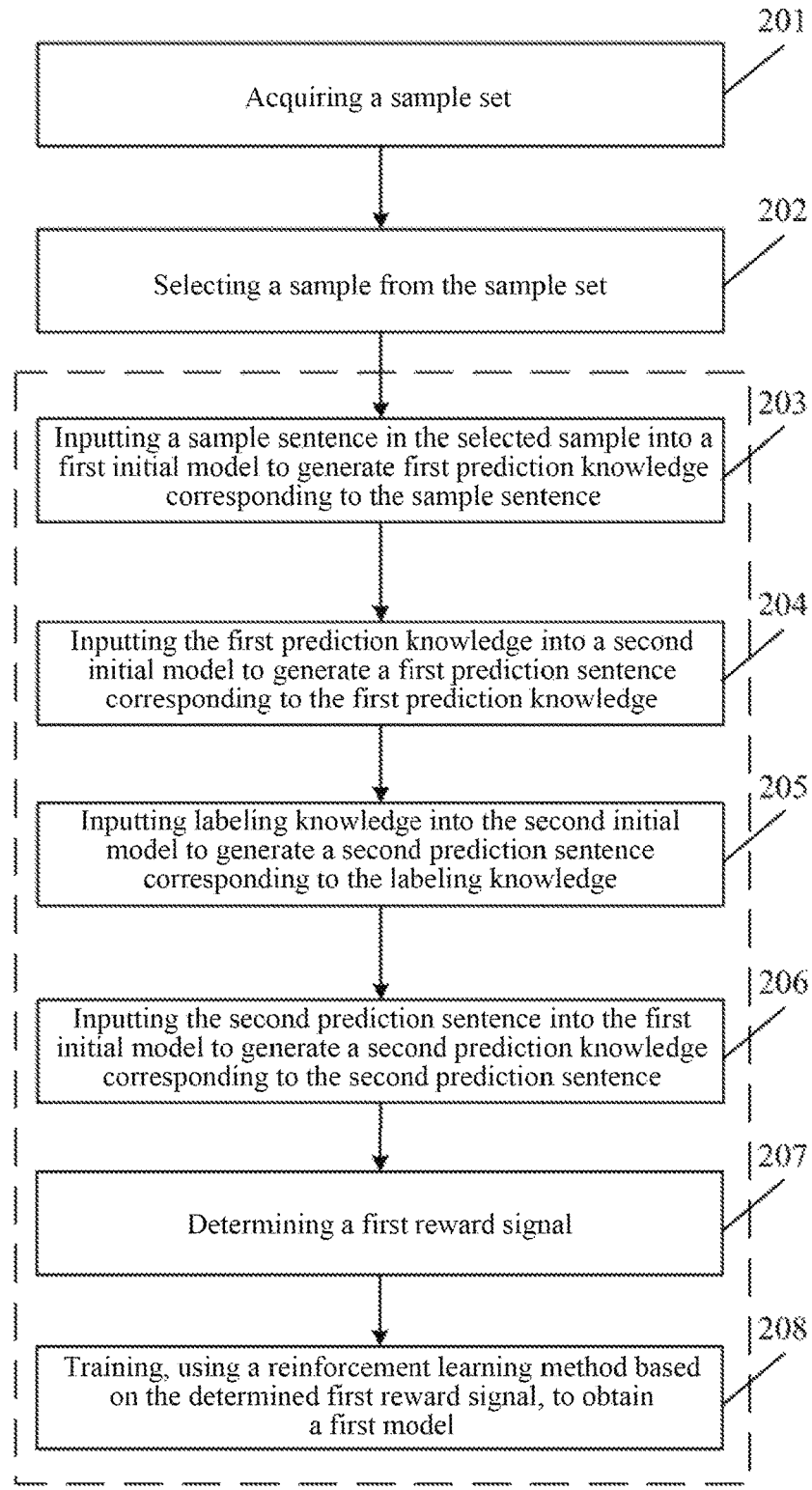
FIG. 2 is a flowchart of an embodiment of a method for generating a model.

With further reference to FIG. 2, a flow 200 of an embodiment of a method for generating a model according to the present disclosure is illustrated. The method for generating a model includes the following steps S201 to S208.

Step 201 includes acquiring a sample set.

In the present embodiment, an executing body of the method for generating a model (e.g., the server or terminal shown in FIG. 1) may acquire a sample set in a variety of ways. For example, the executing body may acquire an existing sample set stored in a database server (e.g., a database server 105 shown in FIG. 1) by a wired connection or a wireless connection. As another example, a user may acquire samples using a terminal (e.g., the terminals 101, 102 shown in FIG. 1). In this way, the executing body may receive the samples acquired by the terminal and store the samples locally, thereby generating a sample set.

Here, the sample set may include at least one sample. The sample may include a sample sentence and labeling knowledge corresponding to the sample sentence. The sample sentence may be a sentence in an open field in which the fields are not divided and the entities are not categorized, and the sample set may be derived from an open source corpus. The knowledge may include information extracted from a natural language sentence and normalized according to a preset rule, and the preset rule may be predefined expressions of types of knowledge in the sentence, such as templates for respective types of knowledge. The knowledge may include knowledge based on a verb or a preposition, knowledge based on a noun attribute, entity description knowledge and knowledge of a relationship between an entity and a concept.

The knowledge based on a verb or a preposition may be knowledge of information representing an action or a state in a sentence, the knowledge based on a noun attribute may be knowledge representing attribute information of a noun in a sentence, the entity description knowledge may be knowledge representing description information of an entity in a sentence, and the knowledge of a relationship between an entity and a concept may be knowledge used to represent the relationship between an entity and a concept.

The preset rule may be used as a rule for labeling the knowledge in the sample sentence by a labeling personnel. For sentence S, the knowledge may be represented by an N-tuple: (Subject, Predicate, object$_1$, . . . , objext$_N$), where Subject represents the subject, usually an entity or a noun, Predicate represents the predicate, usually a verb or a preposition, and object$_1$, . . . , objext$_N$ represents the object, usually an entity or a noun.

As an example, the sentence "Li Bai (701-762), deeply influenced by Zhuangzi's thoughts, is hearty and generous, loves drinking and composing poems, likes to make friends, and his masterpieces including famous poems such as "Viewing the Waterfall at Mount Lu"" contains the verbs "loves", "likes to" and the preposition "influenced by", the entity "Li Bai", the noun "Li Bai", the noun attributes "(701-762)", "masterpieces including "Viewing the Waterfall at Mount Lu"", the description information "hearty and generous", and information representing a relationship between an entity and a concept ""Viewing the Waterfall at Mount Lu" is a famous poem".

In this example, the sentence contains the following types of knowledge: knowledge based on a verb or a preposition: Li Bai, deeply influenced by Zhuangzi's thoughts, loves drinking and composing poems, likes to make friends; knowledge based on a noun attribute: Li Bai's date of birth is in the year 701, Li Bai's date of death is in the year 762, and the masterpiece of Li Bai is "Viewing the Waterfall at Mount Lu"; entity description knowledge: Li Bai's is hearty and generous in nature; and the knowledge of a relationship between an entity and a concept: "Viewing the Waterfall at Mount Lu" is a famous poem.

In some specific application scenarios, the preset rule may specifically include: expressing the knowledge by using the original words in the sentence as much as possible; and for the knowledge that cannot be completely expressed by the original words in the sentence, the following symbols may be introduced for expression:

1) introducing symbols for representing predicates separated in the sentence, where the separated predicates may be predicate words or prepositional words separated by other words in the sentence. For example, in the above example, "Li Bai was, by Zhuangzi's thoughts, deeply influenced" may be expressed as (Li Bai, was by X deeply influenced, Zhuangzi);

2) introducing symbols for representing reduced information in knowledge expressed in reduced expressions in the sentence, the reduced expression refers to an incomplete expression, such as in the above example "Li Bai (701-762)" may be expressed as (Li Bai, BIRTH, year 701) and (Li Bai, DEATH, year 762), in another example, "NBA (National Basketball Association)" may be expressed as (NBA, =, National Basketball Association).

3) introducing symbols for representing hidden knowledge in the sentence to assist in expressing the hidden knowledge in the sentence, such as "London, UK" may be expressed as (London, IN, UK);

4) introducing symbols for representing missing information in the sentence to express the missing information in the sentence to complete the knowledge. For example, in the above example, "likes to make friends" is expressed as (Li Bai, likes to, make friends), and "hearty and generous" is expressed as (Li Bai, DESC, hearty and generous).

In addition, when labeling, it is ensured that each piece of knowledge in the sentence is independent and that all pieces of knowledge are labelled. Moreover, a plurality of nouns or entities connected to the same predicate in the source sentence may be expressed as one piece of knowledge, for example, "Li Bai loves drinking and composing poems" may be standardized and expressed as (Li Bai, loves, [drinking] [composing poems]).

By normalizing the knowledge in the sample sentence according to the above preset rule, richer knowledge is expressed and the accuracy of the knowledge is ensured. Therefore, an information extraction model trained by using a labeled information set corresponding to the sample sentence may accurately extract various types of knowledge in the natural language sentences, thereby perfecting the knowledge base in the open field and providing more complete knowledge information for tasks such as text summary, text comprehension, and lexical similarity.

Step 202 includes selecting a sample from the sample set.

In the present embodiment, the executing body may select a sample from the sample set acquired in step 201, and perform the training steps of steps 203 to 208. The selection method and the number of samples selected are not limited in the present disclosure. For example, at least one sample may be randomly selected, or a sample in which the sample sentence length is within a preset range may be selected.

Step 203 includes inputting a sample sentence in the selected sample into a first initial model to generate first prediction knowledge corresponding to the sample sentence.

In the present embodiment, the executing body may input the sample sentence in the selected sample into the first initial model to generate first prediction knowledge corresponding to the sample sentence. The first initial model may be used to represent a corresponding relationship between the natural language sentence and the prediction knowledge, and the first initial model outputs the generated first prediction knowledge, and may also output the probability of generating each first prediction knowledge. The first initial model may include one or more neural network models, and the neural network model may use a Recurrent Neural Network (RNN). Hidden nodes in the network structure of the recurrent neural network model are connected to form a ring shape. The hidden nodes not only learn the information at the current moment but also depend on the previous sequence information. The problem of information preservation is solved due to the special network model structure of the hidden node. Thus, RNN has a unique advantage in dealing with time series and language text sequence problems. Further, one or more of the variants of the RNN, such as Long Short Term Memory Networks (LSTM) and Gated Recurrent Unit (GRU), may be used to form the first initial model. The first initial model may alternatively be a calculation formula that is pre-set and stored in the executing body based on statistics on a large amount of data by those skilled in the art, and performs a calculation based on the vectorized sequence of natural language sentences to obtain vectorized prediction knowledge. Vectorization may be implemented based on a One-Hot vector, Word2vec (word to vector), and the like. The executing body may further perform preprocessing such as word segmentation on the sample sentence, and input the preprocessing result as an input sequence into the first initial model.

As an example, each word in the sample sentence is represented as a one-hot vector, and each word in the labeling knowledge is represented as a one-hot vector, that is, according to the word number or order in the word list, assuming that the number of words in the word list is n, constructing a binary vector, the length of which is n, finding each word in the sample sentence and the word number or order of each word in the word list in the labeling knowledge. The element corresponding to the word number or order in the vector is 1, and the other elements are 0.

In some alternative implementations of the present embodiment, the first initial model includes an encoder and a decoder; and the inputting a sample sentence into a first initial model to generate first prediction knowledge corresponding to the sample sentence, includes: constructing an input sequence based on the sample sentence; mapping the input sequence to an input hidden state sequence using the encoder, and mapping an output sequence to an output hidden state sequence using the decoder; decoding the input hidden state sequence using the decoder to generate a prediction state sequence; and obtaining the first prediction knowledge based on the prediction state sequence.

Here, the encoder is configured to encode the input sequence to generate an intermediate vector, and the decoder is configured to decode the intermediate vector to obtain a prediction result of the input sequence. Specifically, the encoder may adopt an RNN or a DNN, and includes at least one hidden layer. When encoding, the encoder may perform nonlinear transformation on the current to-be-encoded data in combination with the hidden layer state of the encoder to obtain the intermediate vector. The decoder may adopt an RNN or a DNN, and also include at least one hidden layer. When decoding, the decoder combines the decoded data and the current state of the hidden layer of the decoder, the decodes the intermediate vector to obtain a prediction result. The hidden state sequence may be a state sequence of an hidden layer acquired by transforming the vectorized input sequence and the vectorized output sequence using the hidden layer of the neural network.

When decoding, an intermediate semantic vector for assisting decoding may be generated based on the hidden states of the encoder in generating the input hidden state sequence, and the intermediate semantic vector may be a hidden state of the encoder when encoding the last word in the input sequence, or may be the sum of the hidden states of the encoder. The input hidden states in the input hidden state sequence may be nonlinearly changed sequentially based on the intermediate semantic vector to obtain a prediction result of the current input hidden state. The prediction result may be a prediction state of the hidden layer of the decoder similar to the output hidden state in the output hidden state sequence. The prediction state is then subjected to a nonlinear change to output a prediction result sequence. After decoding each input hidden state, a corresponding prediction state sequence may be obtained.

In some alternative implementations of the present embodiment, the decoding the input hidden state sequence using the decoder to generate a prediction state sequence, includes: acquiring, for a target position in a to-be-generated prediction state sequence, a state of a hidden layer of the decoder after the hidden layer decodes a prediction state of a last position prior to the target position, as a current hidden state of the decoder; calculating matching degrees between input hidden states in the input hidden state sequence and a prediction state of the target position in the to-be-generated prediction state sequence based on the current hidden state; calculating attention weights of the input hidden states on the prediction state of the target position based on the matching degrees; performing a weighted sum of the input hidden states according to the attention weights to obtain a context vector; calculating a probability distribution of the prediction state of the target position based on the context vector, an output hidden state of the last position prior to the target position in the output hidden state sequence, and a state of the hidden layer of the decoder when the hidden layer decodes the prediction state of the target position; and determining the prediction state of the target position based on the probability distribution.

In this implementation, based on an attention mechanism, an attention vector is introduced, and the decoded vocabulary on which the decoding is dependent on and the to-be-decoded vocabulary may be automatically determined based on the semantics of the original sentence, and the semantic dependency of the sample sentences is effectively integrated in the training process to further improve the accuracy of training the model. When determining the prediction state of the target position based on the probability distribution, an algorithm such as Beam Search (a heuristic search algorithm) may be used to obtain an optimal selection.

In some alternative implementations of the present embodiment, a probability of the prediction state of the target position is: a sum of a probability of copying a target word from a corresponding sample sentence as a target object in the output sequence and a probability of selecting a target symbol from a preset symbol set and using an object represented by the target symbol as an object in the output sequence; and symbols in the preset symbol set are used in conjunction with words in the sample sentence to fully represent one of the following knowledge in the sample sentence: knowledge based on a verb or a preposition, knowledge based on a noun attribute, entity description knowledge and knowledge of a relationship between an entity and a concept.

Alternatively, the symbols in the preset symbol set may include, but are not limited to, symbols for representing the predicates separated in the sentence; symbols for representing reduced information in knowledge expressed by reduced expressions in the sentence; symbols for representing implicit knowledge in the sentence; and symbols for representing missing information in the sentence.

In some alternative implementations of the present embodiment, the method further includes: updating, in response to copying a target word from a corresponding sample sentence as an object in the output sequence, a probability of copying the target word from the corresponding sample sentence as the object in the output sequence to zero. An overlay vector may be set as the state during decoding. This overlay vector holds historical information for each copied word. In this way, redundant information generated by the decoder and missing information are avoided.

Step 204 includes inputting the first prediction knowledge into a second initial model to generate a first prediction sentence corresponding to the first prediction knowledge.

In the present embodiment, the executing body may input the first prediction knowledge into a second initial model to generate a first prediction sentence corresponding to the first prediction knowledge. The second initial model may be used to represent the corresponding relationship between prediction knowledge and natural language sentences, while outputting generated natural language sentences, the second initial model may also output the probability of generating each natural language sentence. The second initial model may include one or more neural network models, and a neural network model may use the recurrent neural network (RNN), or may use one or more of the variants of the RNN, e.g., Long Short Term Memory Networks (LSTM) and Gated Recurrent Units (GRUs), to form the first initial model. The second initial model may alternatively be an operation formula that is pre-set and stored in the executing body based on statistics on a large amount of data by those skilled in the art, and performs an operation based on the vectorized prediction knowledge to obtain a vectorized sequence of natural language sentences.

In some alternative implementations of the present embodiment, the second initial model may also include an encoder and a decoder; the encoder and the decoder included in the second initial model may adopt a similar structure to the encoder and the decoder included in the first initial model, and the specific parameters are different.

Step 205 includes inputting labelling knowledge into the second initial model to generate a second prediction sentence corresponding to the labelling knowledge.

In the present embodiment, the executing body may input labelling knowledge into the second initial model to generate a second prediction sentence corresponding to the labeling knowledge.

Step 206 includes inputting the second prediction sentence into the first initial model to generate a second prediction knowledge corresponding to the second prediction sentence.

In the present embodiment, the executing body may input the second prediction sentence into the first initial model to generate a second prediction knowledge corresponding to the second prediction sentence.

Step 207 includes determining a first reward signal.

In the present embodiment, the executing body may determine the first reward signal according to at least one of the following information items: a degree of the first prediction knowledge conforming to a preset knowledge expression rule, a similarity between the first prediction knowledge and the labelling knowledge, and a probability that the second prediction knowledge is the labelling knowledge. The executing body may acquire preset weights for the degree of the first prediction knowledge conforming to the preset knowledge expression rule, the similarity between the first prediction knowledge and the labeling knowledge, and the probability that the second prediction knowledge is the labeling knowledge, perform a weighted sum of a reward signal obtained based on the degree of the first prediction knowledge conforming to the preset knowledge expression rule, a reward signal obtained based on the similarity between the first prediction knowledge and the labeling knowledge, and a reward signal obtained based on the probability that the second prediction knowledge is the labeling knowledge according to the acquired weights to obtain the first reward signal. A set of initial weights may be set and then continuously adjusted according to actual needs. Finally, a set of better weights may be acquired.

Here, the preset knowledge expression rule may be a predefined expression of each type of knowledge in the sentence, such as a template of each type of knowledge. The degree of the first prediction knowledge conforming to the preset knowledge expression rule may be conformed or non-conformed, or a scoring criteria may be determined according to actual needs to quantify the degree to which the preset knowledge expression rule is met. For example, the initial score is 10, and for each expression not conforming to the preset knowledge expression rule, the score is subtracted by a preset value. The preset knowledge expression rule may further include that the first initial model does not include repeated knowledge in the knowledge generated for a certain sentence, and the more the repeated knowledge, the less the generated knowledge conforms to the preset knowledge expression rule. Knowledge repetition may be that the similarity between knowledge is greater than a preset value, such as 0.85.

Since the knowledge extracted from the sentence may include multiple sub-knowledge pieces, for example, the sentence "Li Bai (701-762), deeply influenced by Zhuangzi's thoughts" contains the following three sub-knowledge pieces: Li Bai is deeply influenced by Zhuangzi's thoughts, the date of birth of Li Bai is in the year 701, and the date of death of Li Bai is in the year 762. Therefore, the pieces of knowledge may be matched first, and then the similarity between the sub-knowledge piece f* and the sub-knowledge piece f matched therewith may be calculated based on the matched knowledge pieces, and finally the similarity between the knowledge F* and the knowledge F is determined based on the calculated similarities of the pieces of sub-knowledge.

The similarity SimFact(f*,f) between sub-knowledge piece f* and the sub-knowledge piece f matched therewith may be calculated using the following formula:

$$SimFact(f^*, f) = \frac{\sum_{i=1}^{min(|f^*|,|f|)} SimStr(f_i^*, f_i)}{max(|f^*|, |f|)}$$

Here, $f_i^*$ and $f_i$ respectively represent the $i^{th}$ element in the sub-knowledge f* and $i^{th}$ element in the sub-knowledge f, the element refers to subject, predicate, or object$_1$, ..., objext$_N$ in (Subject, Predicate, object$_1$, ..., objext$_N$), these elements are strings of characters, for example, f*$_0$ represents subject, f1 represents predicate, and f2 represents object$_1$. min(|f*|, |f|) represents one having smaller number of pieces of sub-knowledge between the knowledge F* and the knowledge F, max(|f*|, |f|) represents one having greater number of pieces of sub-knowledge between the knowledge F* and the knowledge F.SimStr($f_i^*$,$f_i$) represents a matching value obtained by calculation between two character strings based on a gestalt pattern matching algorithm. The gestalt pattern matching algorithm first searches for the longest common substring, then iterates on the left and right sides of the substring to perform the longest substring lookup, and then counts the ratio of the number of identical characters to the total number of characters as the similarity. Then, this similarity is used to match the knowledge and the matching method may use a linear assignment model.

The similarity S(F*,F) between the knowledge F* and the knowledge F may be calculated using the following formula:

$$S(F^*, F) = \frac{\sum SimFact(f^*, f)}{\max(|F^*|, |F|)};$$

Here, f* and f are matched pieces of sub-knowledge in the knowledge F* and the knowledge F, max(|F*|, |F|)) represents the one having greater number of pieces of sub-knowledge between the knowledge F* and the knowledge F.

Step 208 includes training, using a reinforcement learning method based on the determined first reward signal, to obtain a first model.

In the present embodiment, the executing body may train, using a reinforcement learning method based on the determined first reward signal, to obtain the first model. Reinforcement learning, also known as evaluation learning, is an important machine learning method, and has many applications in the fields of intelligent control robots and analytical prediction. The learning goal of an reinforcement learning system is to dynamically adjust parameters to achieve a maximum reward signal. In order to obtain the maximum reward signal, the parameters of the first initial model may be updated by using the Policy Gradient, and the parameter corresponding to the maximum first reward signal is determined as the parameter of the first model.

In some alternative implementations of the present embodiment, the training further includes: determining a second reward signal according to at least one of the following information items: a degree of the second prediction sentence conforming to a preset language expression rule, a similarity between the second prediction sentence and the sample sentence, and a probability that the first prediction sentence is the sample sentence; and training, using the reinforcement learning method based on the determined second reward signal, to obtain a second model.

The executing body may acquire preset weights for the degree of the second prediction knowledge conforming to the preset knowledge expression rule, the similarity between the second prediction knowledge and the sample sentence, and the probability that the first prediction sentence is the sample sentence, perform a weighted sum of a reward signal obtained based on the degree of the second prediction knowledge conforming to the preset knowledge expression rule, a reward signal obtained based on the similarity between the second prediction knowledge and the sample sentence, and a reward signal obtained based on the probability that the first prediction sentence is the sample sentence according to the acquired weights to obtain the second reward signal. A set of initial weights may be set and then continuously adjusted according to actual needs. Finally, a set of better weights may be acquired.

Here, the degree that the second prediction sentence conforms to the preset language expression rule is the degree that the second prediction sentence conforms to the natural language expression rule, and a pre-trained language model may be used for calculation.

The first initial model and the second initial model in the method provided by the above embodiments of the present disclosure may perform mutual supervision learning. For each sample sentence and its corresponding labeling knowledge, the first initial model predicts the knowledge corresponding to the sentence, and the second initial model determines the sentence corresponding to the predicted knowledge. If the knowledge generated by the first initial model loses the main information in the original sentence, the probability of regenerating the sample sentence from the knowledge is very low, thus, the probability that the sentence corresponding to the knowledge predicted by the second initial model is the sample sentence is very low. Therefore, the probability may be used as one of the criteria for determining the quality of knowledge extracted by the first initial model. By using more unsupervised information, the accuracy of the trained model may be improved.

Figure 3:
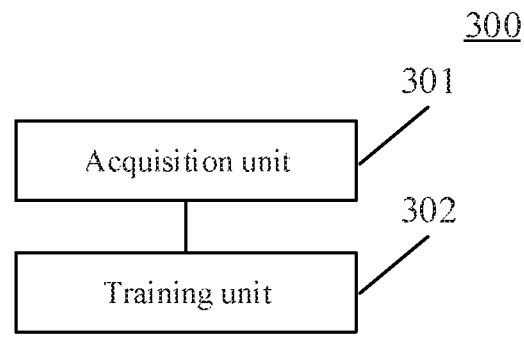
FIG. 3 is a schematic structural diagram of an embodiment of an apparatus for generating a model.

With further reference to FIG. 3, as an implementation of the method shown in the FIG. 2, the present disclosure provides an embodiment of an apparatus for generating a model, and the apparatus embodiment corresponds to the method embodiment as shown in FIG. 2, and the apparatus may be specifically applied to various electronic devices.

As shown in FIG. 3, the apparatus 300 for generating a model of the present embodiment includes: an acquisition unit 301 and a training unit 302. The acquisition unit 301 is configured to acquire a sample set, the sample set including sample sentences and labeling knowledge corresponding to the sample sentences. The training unit 302 is configured to select a sample from the sample set, and perform the following training steps: inputting a sample sentence in the selected sample into a first initial model to generate first prediction knowledge corresponding to the sample sentence; inputting the first prediction knowledge into a second initial model to generate a first prediction sentence corresponding to the first prediction knowledge; inputting labeling knowledge into the second initial model to generate a second prediction sentence corresponding to the labeling knowledge; inputting the second prediction sentence into the first initial model to generate a second prediction knowledge corresponding to the second prediction sentence; determining a first reward signal according to at least one of the following information items: a degree of the first prediction knowledge conforming to a preset knowledge expression rule, a similarity between the first prediction knowledge and the labeling knowledge, and a probability that the second prediction knowledge is the labeling knowledge; and training, using a reinforcement learning method based on the determined first reward signal, to obtain a first model.

In the present embodiment, the specific processing of the acquisition unit 301 and the training unit 302 of the apparatus 300 for generating a model may refer to step 201, step 202 to step 208 in the corresponding embodiment of FIG. 2.

In some alternative implementations of the present embodiment, the training unit further includes: a determining subunit, configured to determine a second reward signal according to at least one of the following information items: a degree of the second prediction sentence conforming to a preset language expression rule, a similarity between the second prediction sentence and the sample sentence, and a probability that the first prediction sentence is the sample sentence; and a training subunit, configured to train, using the reinforcement learning method based on the determined second reward signal, to obtain a second model.

In some alternative implementations of the present embodiment, the first initial model includes an encoder and a decoder; and the training unit is further configured to generate first prediction knowledge corresponding to the sample sentence as follows: constructing an input sequence based on the sample sentence; mapping the input sequence to an input hidden state sequence using the encoder, and mapping an output sequence to an output hidden state sequence using the decoder; decoding the input hidden state sequence using the decoder to generate a prediction state sequence; and obtaining the first prediction knowledge based on the prediction state sequence.

In some alternative implementations of the present embodiment, the training unit is further configured to generate a prediction state sequence as follows: acquiring, for a target position in a to-be-generated prediction state sequence, a state of a hidden layer of the decoder after the hidden layer decodes a prediction state of a last position prior to the target position, as a current hidden state of the decoder; calculating matching degrees between input hidden states in the input hidden state sequence and a prediction state of the target position in the to-be-generated prediction state sequence based on the current hidden state; calculating an attention weight of each of the input hidden states on the prediction state of the target position based on the matching degrees; performing a weighted sum of the input hidden states according to the attention weights to obtain a context vector; calculating a probability distribution of the prediction state of the target position based on the context vector, an output hidden state of the last position prior to the target position in the output hidden state sequence, and a state of the hidden layer of the decoder when the hidden layer decodes the prediction state of the target position; and determining the prediction state of the target position based on the probability distribution.

In some alternative implementations of the present embodiment, a probability of the prediction state of the target position is: a sum of a probability of copying a target word from a corresponding sample sentence as a target object in the output sequence and a probability of selecting a target symbol from a preset symbol set and using an object represented by the target symbol as an object in the output sequence; and symbols in the preset symbol set are used in conjunction with words in the sample sentence to fully represent one of the following knowledge in the sample sentence: knowledge based on a verb or a preposition, knowledge based on a noun attribute, entity description knowledge and knowledge of a relationship between an entity and a concept.

In some alternative implementations of the present embodiment, the apparatus further includes: an updating unit, configured to update, in response to copying a target word from a corresponding sample sentence as an object in the output sequence, a probability of copying the target word from the corresponding sample sentence as an object in the output sequence to zero.

The apparatus for generating a model provided by the embodiments of the present disclosure, acquires a sample set, the sample set including sample sentences and labeling knowledge corresponding to the sample sentences; and selects a sample from the sample set, and performs the following training steps: inputting a sample sentence in the selected sample into a first initial model to generate first prediction knowledge corresponding to the sample sentence; inputting the first prediction knowledge into a second initial model to generate a first prediction sentence corresponding to the first prediction knowledge; inputting labeling knowledge into the second initial model to generate a second prediction sentence corresponding to the labeling knowledge; inputting the second prediction sentence into the first initial model to generate a second prediction knowledge corresponding to the second prediction sentence; determining a first reward signal according to at least one of the following information items: a degree of the first prediction knowledge conforming to a preset knowledge expression rule, a similarity between the first prediction knowledge and the labeling knowledge, and a probability that the second prediction knowledge is the labeling knowledge; and training, using a reinforcement learning method based on the determined first reward signal, to obtain a first model, thereby enriching the method for generating a model.

Figure 4:
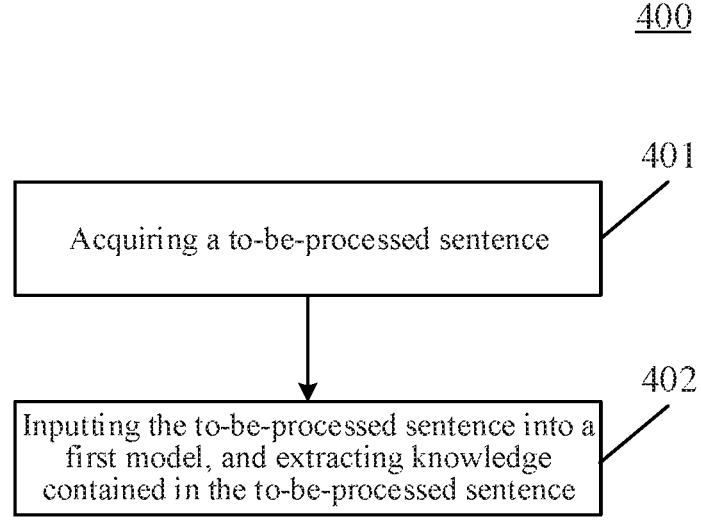
FIG. 4 is a flowchart of an embodiment of a method for extracting information.

With reference to FIG. 4, a flow 400 of an embodiment of a method for extracting information according to the present disclosure is illustrated. The method for extracting information may include the following steps S401 and S402.

Step 401 includes acquiring a to-be-processed sentence.

In the present embodiment, an executing body of the method for extracting information (e.g., the server 104 shown in FIG. 1) may acquire a to-be-processed sentence in a variety of ways. For example, the executing body may acquire a to-be-processed sentence stored from a database server by a wired connection or a wireless connection. As another example, the executing body may receive a to-be-processed sentence sent by a terminal (such as the terminals 101, 102 shown in FIG. 1) or other device.

Step 402 include inputting the to-be-processed sentence into a first model, and extracting knowledge contained in the to-be-processed sentence.

In the present embodiment, the executing body may input the to-be-processed sentence acquired in step 401 into the first model, thereby extracting knowledge contained in the to-be-processed sentence. In the present embodiment, the to-be-processed sentence may be a piece of natural language text. The first model may be generated using the method as described in the embodiment of FIG. 2 above. For the specific generation process, related description may be referred to in the embodiment of FIG. 2, and detailed descriptions thereof will be omitted.

Figure 5:
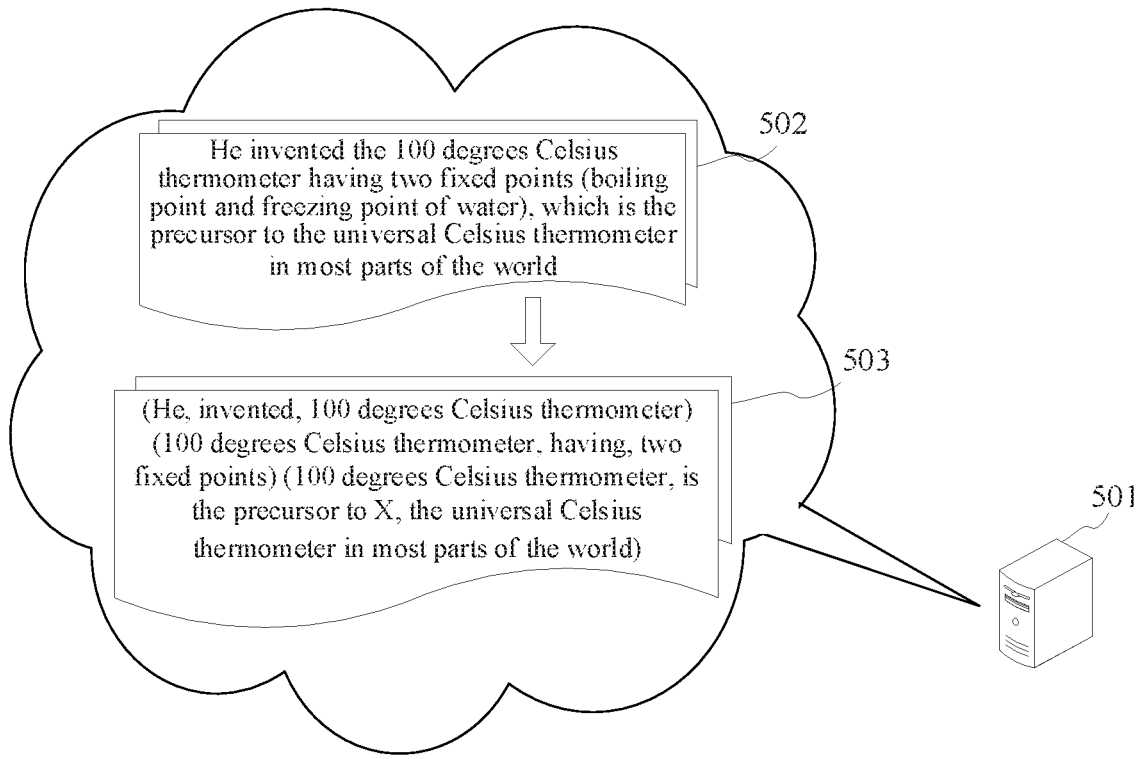
FIG. 5 is a schematic diagram of an application scenario of the method for extracting information according to some embodiments of the present disclosure.

With further reference to FIG. 5, FIG. 5 is a schematic diagram of an application scenario of the method for extracting information according to the present embodiment. In the application scenario of FIG. 5, a server 501 acquires a to-be-processed sentence 502 "He invented the 100 degrees Celsius thermometer having two fixed points (boiling point and freezing point of water), which is the precursor to the universal Celsius thermometer in most parts of the world." The to-be-processed sentence 502 is inputted into the first model, and extracted knowledge 503 may include: (he, invented, 100 degrees Celsius thermometer) (100 degrees Celsius thermometer, having, two fixed points) (100 degrees Celsius thermometer, is the precursor to X, the universal Celsius thermometer in most parts of the world).

Figure 6:
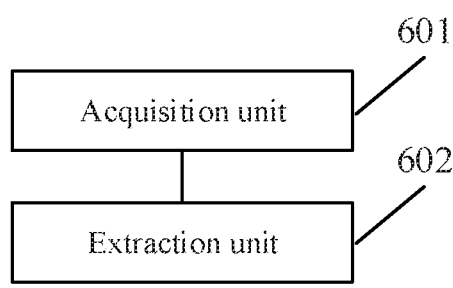
FIG. 6 is a schematic structural diagram of an embodiment of an apparatus for extracting information.

With further reference to FIG. 6, as an implementation of the method shown in the FIG. 4, the present disclosure provides an embodiment of an apparatus for extracting information, and the apparatus embodiment corresponds to the method embodiment as shown in FIG. 4, and the apparatus may be specifically applied to various electronic devices.

As shown in FIG. 6, the apparatus 600 for extracting information of the present embodiment may include: an acquisition unit 601, configured to acquire a to-be-processed sentence; and an extraction unit 602, configured to input the to-be-processed sentence into a first model generated using the method as described in the embodiment of FIG. 2 above, and extract knowledge contained in the to-be-processed sentence.

It may be understood that the units recorded in the apparatus 600 correspond to the steps in the method described with reference to FIG. 5. Thus, the operations, features, and resulting advantageous effects described above for the method are equally applicable to the apparatus 600 and the units contained therein, and detailed descriptions thereof will be omitted.

Figure 7:
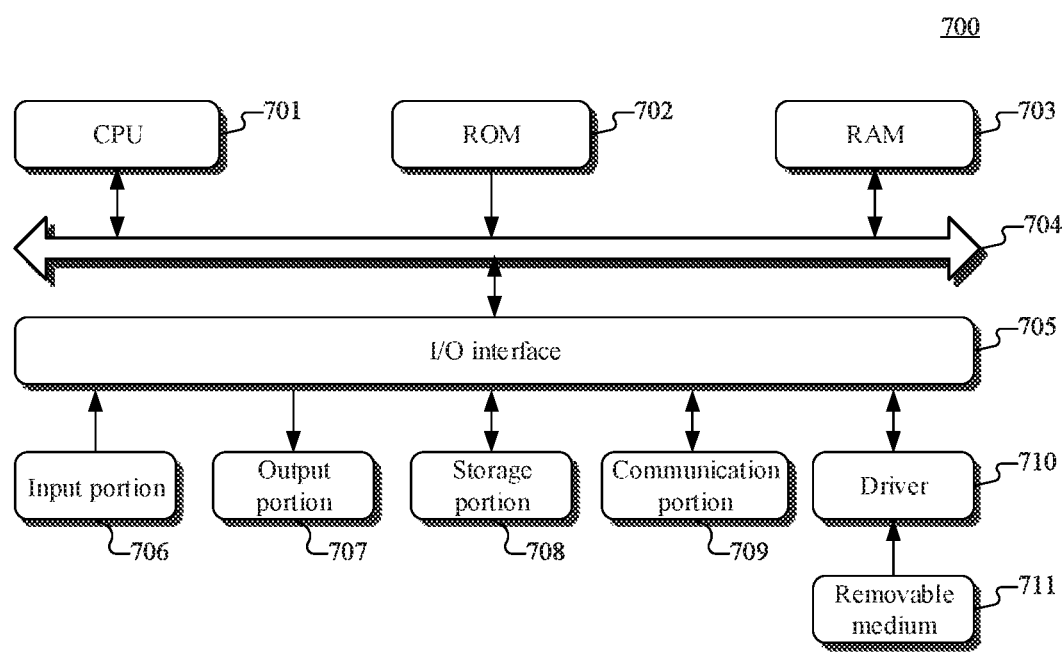
FIG. 7 is a schematic structural diagram of a computer system adapted to implement a server or a terminal of the embodiments of the present disclosure.

With further reference to FIG. 7, a schematic structural diagram of a computer system 700 adapted to implement a server or a terminal of the embodiments of the present disclosure is shown. The electronic device shown in FIG. 7 is merely an example, and should not impose any limitation on the function and scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a touch screen, a keyboard, a mouse, a camera, etc.; an output portion 707 including such as a cathode ray tube (CRT), a liquid crystal display device (LCD), a speaker, etc.; a storage portion 708 including a hard disk and the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 709, and/or may be installed from the removable medium 711. The computer program, when executed by the central processing unit (CPU) 701, implements the above mentioned functionalities as defined by the method of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In some embodiments of the present disclosure, the computer readable medium may be any physical medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor, including an acquisition unit and a training unit. Here, the names of these units do not in some cases constitute limitations to such units themselves. For example, the acquisition unit may also be described as "a unit configured to acquire a sample set."

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: acquire a sample set, the sample set including sample sentences and labeling knowledge corresponding to the sample sentences; and select a sample from the sample set, and perform the following training steps: inputting a sample sentence in the selected sample into a first initial model to generate first prediction knowledge corresponding to the sample sentence; inputting the first prediction knowledge into a second initial model to generate a first prediction sentence corresponding to the first prediction knowledge;

inputting labeling knowledge into the second initial model to generate a second prediction sentence corresponding to the labeling knowledge; inputting the second prediction sentence into the first initial model to generate a second prediction knowledge corresponding to the second prediction sentence; determining a first reward signal according to at least one of the following information items: a degree of the first prediction knowledge conforming to a preset knowledge expression rule, a similarity between the first prediction knowledge and the labeling knowledge, and a probability that the second prediction knowledge is the labeling knowledge; and training, using a reinforcement learning method based on the determined first reward signal to obtain a first model.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for generating a model, the method comprising:
   acquiring a sample set, the sample set comprising sample sentences and labeling knowledge corresponding to the sample sentences; and
   selecting a sample from the sample set, and performing following training steps: inputting a sample sentence in the selected sample into a first initial model to generate first prediction knowledge corresponding to the sample sentence; inputting the first prediction knowledge into a second initial model to generate a first prediction sentence corresponding to the first prediction knowledge; inputting labeling knowledge into the second initial model to generate a second prediction sentence corresponding to the labeling knowledge; inputting the second prediction sentence into the first initial model to generate a second prediction knowledge corresponding to the second prediction sentence; determining a first reward signal according to at least one of following information items: a degree of the first prediction knowledge conforming to a preset knowledge expression rule, a similarity between the first prediction knowledge and the labeling knowledge, and a probability that the second prediction knowledge is the labeling knowledge; and training, using a reinforcement learning method based on the determined first reward signal, to obtain a first model.

2. The method according to claim 1, wherein the training steps further comprise:
   determining a second reward signal according to at least one of following information items: a degree of the second prediction sentence conforming to a preset language expression rule, a similarity between the second prediction sentence and the sample sentence, and a probability that the first prediction sentence is the sample sentence; and
   training, using the reinforcement learning method based on the determined second reward signal, to obtain a second model.

3. The method according to claim 2, wherein the first initial model comprises an encoder and a decoder; and
   the inputting a sample sentence in the selected sample into a first initial model to generate first prediction knowledge corresponding to the sample sentence, comprises:
   constructing an input sequence based on the sample sentence;
   mapping the input sequence to an input hidden state sequence using the encoder, and mapping an output sequence to an output hidden state sequence using the decoder;
   decoding the input hidden state sequence using the decoder to generate a prediction state sequence; and
   obtaining the first prediction knowledge based on the prediction state sequence.

4. The method according to claim 3, wherein the decoding the input hidden state sequence using the decoder to generate a prediction state sequence, comprises:
   acquiring, for a target position in a to-be-generated prediction state sequence, a state of an hidden layer of the decoder after the decoder acquires a prediction state of a last position prior to the target position by decoding, as a current hidden state of the decoder;
   calculating matching degrees between input hidden states in the input hidden state sequence and a prediction state of the target position in the to-be-generated prediction state sequence based on the current hidden state;
   calculating attention weights of the input hidden states on the prediction state of the target position based on the matching degrees;
   performing a weighted sum of the input hidden states according to the attention weights to obtain a context vector;
   calculating a probability distribution of the prediction state of the target position based on the context vector, an output hidden state of the last position prior to the target position in the output hidden state sequence, and a state of the hidden layer of the decoder when the hidden layer of the decoder decodes the prediction state of the target position; and
   determining the prediction state of the target position based on the probability distribution.

5. The method according to claim 4, wherein a probability of the prediction state of the target position is: a sum of a probability of copying a target word from a corresponding sample sentence as a target object in the output sequence and a probability of selecting a target symbol from a preset symbol set and using an object represented by the target symbol as an object in the output sequence; and
   symbols in the preset symbol set are used in conjunction with words in the sample sentence to fully represent one of following knowledge in the sample sentence: knowledge based on a verb or a preposition, knowledge based on a noun attribute, entity description knowledge and knowledge of a relationship between an entity and a concept.

6. The method according to claim 5, wherein the method further comprises:
   updating, in response to copying a target word from a corresponding sample sentence as an object in the output sequence, a probability of copying the target word from the corresponding sample sentence as the object in the output sequence to zero.

7. An apparatus for generating a model, the apparatus comprising:
at least one processor; and
a memory storing instructions, wherein the instructions, when executed by the at least one processor, cause the at least one processor to perform operations, the operations comprising:
acquiring a sample set, the sample set comprising sample sentences and labeling knowledge corresponding to the sample sentences; and
selecting a sample from the sample set, and perform following training steps: inputting a sample sentence in the selected sample into a first initial model to generate first prediction knowledge corresponding to the sample sentence; inputting the first prediction knowledge into a second initial model to generate a first prediction sentence corresponding to the first prediction knowledge; inputting labeling knowledge into the second initial model to generate a second prediction sentence corresponding to the labeling knowledge; inputting the second prediction sentence into the first initial model to generate a second prediction knowledge corresponding to the second prediction sentence; determining a first reward signal according to at least one of following information items: a degree of the first prediction knowledge conforming to a preset knowledge expression rule, a similarity between the first prediction knowledge and the labeling knowledge, and a probability that the second prediction knowledge is the labeling knowledge; and training, using a reinforcement learning method based on the determined first reward signal to obtain a first model.

8. The apparatus according to claim 7, wherein the training steps further comprise:
determining a second reward signal according to at least one of following information items: a degree of the second prediction sentence conforming to a preset language expression rule, a similarity between the second prediction sentence and the sample sentence, and a probability that the first prediction sentence is the sample sentence; and
training, using the reinforcement learning method based on the determined second reward signal to obtain a second model.

9. The apparatus according to claim 8, wherein the first initial model comprises an encoder and a decoder; and
the inputting a sample sentence in the selected sample into a first initial model to generate first prediction knowledge corresponding to the sample sentence, comprises:
constructing an input sequence based on the sample sentence;
mapping the input sequence to an input hidden state sequence using the encoder, and mapping an output sequence to an output hidden state sequence using the decoder;
decoding the input hidden state sequence using the decoder to generate a prediction state sequence; and
obtaining the first prediction knowledge based on the prediction state sequence.

10. The apparatus according to claim 9, wherein the decoding the input hidden state sequence using the decoder to generate a prediction state sequence, comprises:
acquiring, for a target position in a to-be-generated prediction state sequence, a state of an hidden layer of the decoder after the decoder acquires a prediction state of a last position prior to the target position by decoding, as a current hidden state of the decoder;
calculating matching degrees between input hidden states in the input hidden state sequence and a prediction state of the target position in the to-be-generated prediction state sequence based on the current hidden state;
calculating attention weights of the input hidden states on the prediction state of the target position based on the matching degrees;
performing a weighted sum of the input hidden states according to the attention weights to obtain a context vector;
calculating a probability distribution of the prediction state of the target position based on the context vector, an output hidden state of the last position prior to of the target position in the output hidden state sequence, and a state of the hidden layer of the decoder when the hidden layer of the decoder decodes the prediction state of the target position; and
determining the prediction state of the target position based on the probability distribution.

11. The apparatus according to claim 10, wherein a probability of the prediction state of the target position is: a sum of a probability of copying a target word from a corresponding sample sentence as a target object in the output sequence and a probability of selecting a target symbol from a preset symbol set and using an object represented by the target symbol as an object in the output sequence; and
symbols in the preset symbol set are used in conjunction with words in the sample sentence to fully represent one of following knowledge in the sample sentence: knowledge based on a verb or a preposition, knowledge based on a noun attribute, entity description knowledge and knowledge of a relationship between an entity and a concept.

12. The apparatus according to claim 11, wherein the operations further comprise:
updating, in response to copying a target word from a corresponding sample sentence as an object in the output sequence, a probability of copying the target word from the corresponding sample sentence as the object in the output sequence to zero.

13. A method for extracting information using the first model generated by the method according to claim 1, comprising:
acquiring a to-be-processed sentence; and
inputting the to-be-processed sentence into the first model, and extracting knowledge contained in the to-be-processed sentence.

14. An apparatus for extracting information using the first model generated by the apparatus according to claim 7, wherein the apparatus for extracting information stores instructions when executed by the processor cause the processor to perform following operations:
acquiring a to-be-processed sentence; and
inputting the to-be-processed sentence into the first model, and extracting knowledge contained in the to-be-processed sentence.

15. A non-transitory computer readable medium, storing a computer program thereon, the program, when executed by a processor, causes the processor to perform operations, the operations comprising;
acquiring a sample set, the sample set comprising sample sentences and labeling knowledge corresponding to the sample sentences; and
selecting a sample from the sample set, and performing following training steps: inputting a sample sentence in the selected sample into a first initial model to generate first prediction knowledge corresponding to the sample sentence; inputting the first prediction knowledge into a second initial model to generate a first prediction sentence corresponding to the first prediction knowledge; inputting labeling knowledge into the second initial model to generate a second prediction sentence corresponding to the labeling knowledge; inputting the second prediction sentence into the first initial model to generate a second prediction knowledge corresponding to the second prediction sentence; determining a first reward signal according to at least one of following information items: a degree of the first prediction knowledge conforming to a preset knowledge expression rule, a similarity between the first prediction knowledge and the labeling knowledge, and a probability that the second prediction knowledge is the labeling knowledge; and training, using a reinforcement learning method based on the determined first reward signal, to obtain a first model.

* * * * *